US009961179B2

(12) United States Patent
Zhao et al.

(10) Patent No.: US 9,961,179 B2
(45) Date of Patent: May 1, 2018

(54) METHODS AND SYSTEMS FOR PRESENTING AN ALERT WHEN LEAVING A DIRECT-MODE COVERAGE AREA

(71) Applicant: MOTOROLA SOLUTIONS, INC, Chicago, IL (US)

(72) Inventors: Dong Zhao, Chengdu (CN); Yi Tang, Chengdu (CN); Fan Yang, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days. days.

(21) Appl. No.: 15/320,330

(22) PCT Filed: Jul. 28, 2014

(86) PCT No.: PCT/CN2014/083127
§ 371 (c)(1),
(2) Date: Dec. 20, 2016

(87) PCT Pub. No.: WO2016/015195
PCT Pub. Date: Feb. 4, 2016

(65) Prior Publication Data
US 2017/0257473 A1 Sep. 7, 2017

(51) Int. Cl.
H04M 1/725 (2006.01)
H04W 4/90 (2018.01)
H04W 8/14 (2009.01)
H04W 4/02 (2018.01)
H04L 12/26 (2006.01)
H04W 4/22 (2009.01)
H04W 84/18 (2009.01)

(52) U.S. Cl.
CPC ........ *H04M 1/72516* (2013.01); *H04L 43/10* (2013.01); *H04W 4/025* (2013.01);
(Continued)

(58) Field of Classification Search
CPC ..... H04W 4/008; H04W 88/06; H04W 84/12; H04W 36/0083; H04W 48/18;
(Continued)

(56) References Cited

U.S. PATENT DOCUMENTS 6,289,218 B1    9/2001  Liu
6,532,233 B1 *  3/2003  Matsunaga ........... H04L 12/185
                                                     370/390
(Continued)

FOREIGN PATENT DOCUMENTS

CN    102790963 A    11/2012

OTHER PUBLICATIONS

The International Search Report and the Written Opinion, for corresponding application No. PCT/CN2014/083127, dated Jul. 28, 2014, all pages.

*Primary Examiner* — Olumide T Ajibade Akonai

(57) ABSTRACT

At least one embodiment takes the form of a process carried out by a given mobile radio in a group of mobile radios. The process includes broadcasting heartbeat messages in accordance with a group-wide symmetric-timing protocol and maintaining an in-range list of mobile radios. The in-range list is maintained at least in part by (i) adding mobile radios that are not already on the in-range list to the in-range list upon detecting transmissions from such mobile radios; (ii) maintaining, for each mobile radio on the in-range list, a respective keepalive timer in accordance with the group-wide symmetric-timing protocol; and (iii) removing mobile radios from the in-range list upon expiration of the respective keepalive timers. The process further includes presenting an alert via a user interface when a count of mobile radios on the in-range list falls below a notification threshold.

20 Claims, 17 Drawing Sheets

(52) U.S. Cl.
CPC ............... *H04W 4/22* (2013.01); *H04W 4/90* (2018.02); *H04W 8/14* (2013.01); *H04W 84/18* (2013.01)

(58) Field of Classification Search
CPC ..... H04W 76/025; H04W 4/08; H04W 84/18; H04W 8/005; G06F 12/0246; H04L 51/04; H04L 65/1083; H04L 65/604; H04L 12/1831; H04L 65/403; G06Q 10/10; G06Q 10/1093; G06Q 10/1095; G06Q 50/01; G06Q 30/0267; H04M 11/00; H04M 1/72516
See application file for complete search history.

(56) References Cited

U.S. PATENT DOCUMENTS

| | | | |
|---|---|---|---|
| 2001/0022780 A1* | 9/2001 | Mizutani | H04M 3/42 370/261 |
| 2004/0044647 A1* | 3/2004 | Salmenkaita | G06Q 10/10 |
| 2006/0062175 A1* | 3/2006 | Ling | H04L 45/00 370/328 |
| 2007/0060098 A1 | 3/2007 | McCoy | |
| 2007/0117572 A1* | 5/2007 | Adam | G01S 5/0294 455/456.1 |
| 2008/0125106 A1 | 5/2008 | Lee et al. | |
| 2010/0080177 A1 | 4/2010 | Rofougaran | |
| 2011/0053493 A1* | 3/2011 | Yanagihara | H04W 84/20 455/7 |
| 2011/0124316 A1 | 5/2011 | Mauney et al. | |
| 2012/0135711 A1 | 5/2012 | Jabara et al. | |
| 2013/0018951 A1* | 1/2013 | Piccinini | H04L 65/1063 709/204 |
| 2013/0252656 A1 | 9/2013 | Lee et al. | |
| 2013/0324177 A1 | 12/2013 | Wiatrowski et al. | |
| 2015/0099469 A1* | 4/2015 | Goldstein | H04L 67/24 455/41.2 |

* cited by examiner

*400*

| RADIO ID | KEEPALIVE TIMER | LAST-KNOWN LOCATION |
|---|---|---|
| 104 | 60 | 41°52'51.6" N   87°38'02.9" W |
| 106 | 60 | 41°52'46.7" N   87°38'27.5" W |
| 108 | 60 | 41°52'45.2" N   87°38'13.9" W |

| RADIO ID (412) | KEEPALIVE TIMER (414) | LAST-KNOWN LOCATION (416) |
|---|---|---|
| 104 | 60 | 41°52'51.6" N  87°38'02.9" W |
| 106 | 60 | |
| 108 | 60 | |

| RADIO ID | KEEPALIVE TIMER | LAST-KNOWN LOCATION |
|---|---|---|
| 104 | 60 | 41°52'37.6" N  87°38'01.9" W |
| 106 | 60 | |

| RADIO ID | KEEPALIVE TIMER | LAST-KNOWN LOCATION |
|----------|-----------------|---------------------|
| 104 | 60 | 41°52'37.6" N   87°38'01.9" W |

412 — RADIO ID
414 — KEEPALIVE TIMER
416 — LAST-KNOWN LOCATION
402

*FIG. 13*

METHODS AND SYSTEMS FOR PRESENTING AN ALERT WHEN LEAVING A DIRECT-MODE COVERAGE AREA

This application is a National Stage filing under 35 USC § 371 of co-pending Patent Cooperation Treaty international application having Serial No. PCT/CN14/083127 (the 'PCT international application') filed on Jul. 28, 2014. This application claims priority to the PCT international application, the entire contents of which are incorporated herein by reference.

BACKGROUND OF THE INVENTION

It is important for public-safety responders to be able to communicate with each other on a regular basis. As a result, one of the most commonly used tools in the public-safety context is a wireless-communication device (WCD)—referred to in this disclosure as a "mobile radio." Examples of commonly used mobile radios include cell phones, smartphones, tablets, notebook computers, laptop computers, and the like, and further examples include a handheld transceiver, often referred to by terms such as walkie-talkie, two-way radio, and the like. Some mobile radios include the functionality of, e.g., both a smartphone and a two-way radio. And certainly many other examples of mobile radios could be listed as well, as known to those having skill in the relevant art.

Mobile radios are generally configured with the ability to communicate with other network entities via a wireless network. Well known examples of wireless-communication protocols according to which such wireless networks operate include relatively long-range wireless-communication protocols (e.g., Global System for Mobile Communications (GSM), Long Term Evolution (LTE), and the like), relatively short-range wireless-communication protocols (e.g., WiFi and the like), and/or one or more land mobile radio (LMR) protocols (e.g., European Telecommunications Standards Institute Digital Mobile Radio (ETSI-DMR), Terrestrial Trunked Radio (TETRA), APCO Project 25 (P25), Digital Mobile Radio (DMR), and the like), among numerous other examples.

Mobile radios in an infrastructure-based wireless network typically communicate over an air interface with a network-dedicated base station such as a base transceiver station (BTS), an eNodeB, a wireless access point, and/or a WiFi router (among other examples). The base station is generally responsible for relaying communications between mobile radios and/or between other networks (such as the Internet). Direct communication between mobile radios is generally unnecessary (though it is typically still an option) if the mobile radios are within a coverage area of an infrastructure-based wireless network.

An ad-hoc wireless network, in contrast, typically does not include a dedicated base station for relaying communications. Rather, a given mobile radio in an ad-hoc network will typically communicate directly with other mobile radios that may be within the coverage area of the given mobile radio, and may otherwise rely on intermediate mobile radios to relay communication with mobile radios that are outside of the coverage area. Some mobile radios can function (often according to various device modes) in both infrastructure-based wireless networks and ad-hoc wireless networks, as is known to those having skill in the art. An ad-hoc network is often referred to as "direct-mode" network (and is referred to as such in this disclosure).

Given the portable nature of mobile radios (e.g., handheld mobile radios such as smartphones, two-way radios, etc.), the coverage area of a direct-mode network of mobile radios may change as various mobile radios within the network move to different locations. This change in coverage may result in a given mobile radio, having been previously located within the coverage area of a direct-mode network, subsequently being located outside of the coverage area. A mobile radio that is outside the coverage area of the direct-mode network would typically be unable to communicate with other mobile radios within the network (if, for example, the mobile radios are not within a coverage area of an infrastructure-based network).

It is desirable for a public-safety responder to maintain the ability to communicate with other public-safety responders for at least the reason that the immediacy and efficacy with which public-safety responders can communicate with one another are quite often determinative of the ultimate outcome of a given incident. Accordingly, there is a need for methods and systems for presenting an alert when a mobile radio of a public-safety responder is leaving a direct-mode coverage area.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 depicts an in-range list of mobile radios, in accordance with at least one embodiment.

FIGS. 8, 10, and 13 depict an in-range list of mobile radios at a first, second, and third time, respectively, in accordance with at least one embodiment.

Figure 1:
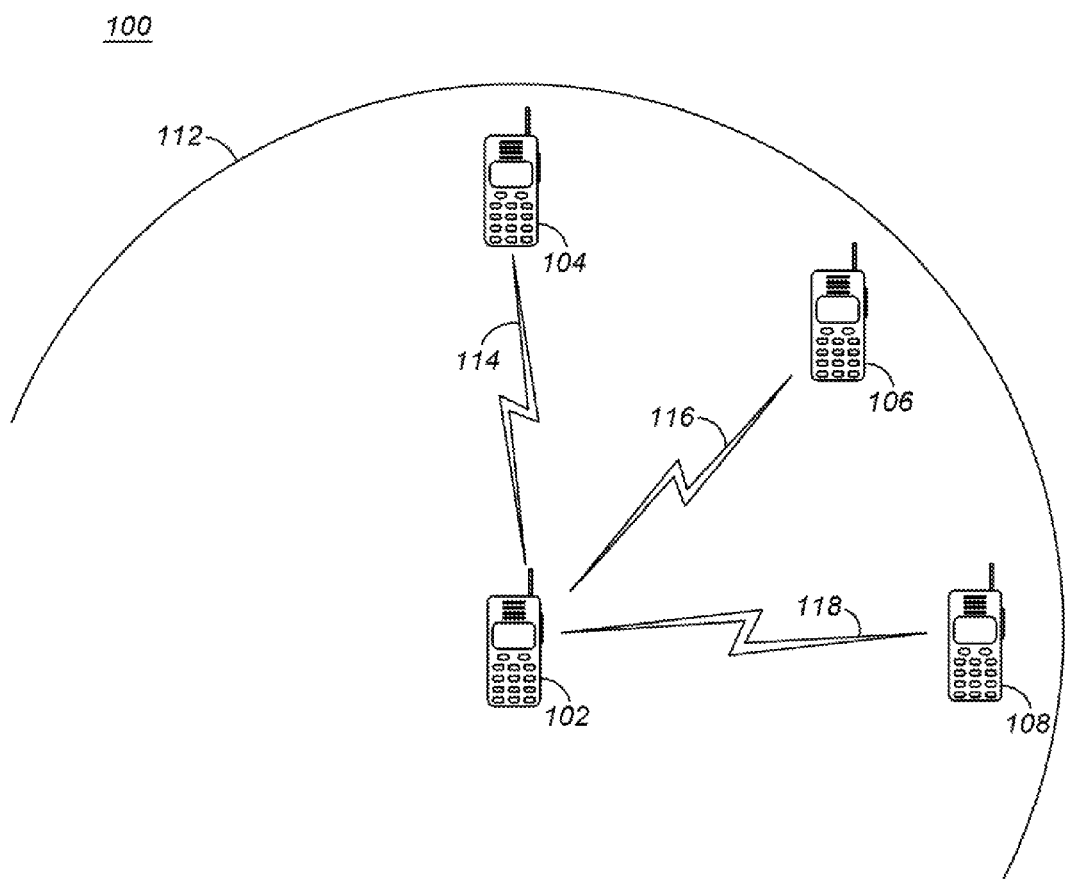
FIG. 1 depicts a coverage area of a mobile radio, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for presenting an alert when a mobile radio is leaving a coverage area of, e.g., a direct-mode network. One embodiment takes the form of a process carried out by a given mobile radio in a group of mobile radios. The process includes broadcasting heartbeat messages in accordance with a group-wide symmetric-timing protocol and maintaining an in-range list of mobile radios. The in-range list is maintained at least in part by (i) adding mobile radios that are not already on the in-range list to the in-range list upon detecting transmissions from such mobile radios; (ii) maintaining, for each mobile radio on the in-range list, a respective keepalive timer in accordance with the group-wide symmetric-timing protocol; and (iii) removing mobile radios from the in-range list upon expiration of the respective keepalive timers. The process further includes presenting an alert via a user interface when a count of mobile radios on the in-range list falls below a notification threshold.

Another embodiment takes the form of a mobile radio includes a wireless-communication interface, a user interface, a processor, and data storage containing instructions executable by the processor for causing the mobile radio to carry out at least the functions described in the preceding paragraph. Moreover, any of the variations and permutations described in the ensuing paragraphs and anywhere else in this disclosure can be implemented with respect to any embodiments, including with respect to any method embodiments and with respect to any mobile-radio embodiments.

In at least one embodiment, the mobile radio includes a location of the given mobile radio in at least one broadcasted heartbeat message. In at least one embodiment, broadcasting heartbeat messages in accordance with the group-wide symmetric-timing protocol includes broadcasting a heartbeat message at an expiration of a heartbeat timer. In at least one such embodiment, the mobile radio resets the heartbeat timer to an initial heartbeat-timer value in response to transmitting at least one of voice data, a signaling message, and a heartbeat message. In at least one other such embodiment, the mobile radio adjusts the initial heartbeat-timer value in accordance with the group-wide symmetric-timing protocol based on the count of mobile radios on the in-range list. In at least one other such embodiment, the mobile radio adjusts the initial heartbeat-timer value in accordance with the group-wide symmetric-timing protocol based on a velocity of the given mobile radio.

In at least one embodiment, detecting transmissions from mobile radios includes detecting transmitted voice data from the mobile radios. In at least one embodiment, detecting transmissions from mobile radios includes detecting transmitted signaling messages from the mobile radios. In at least one embodiment, detecting transmissions from mobile radios includes detecting transmitted heartbeat messages from the mobile radios. In at least one such embodiment, the detected heartbeat messages include respective locations of the transmitting mobile radios, and maintaining the in-range list of mobile radios further includes maintaining last-known locations of mobile radios on the in-range list based on the locations in the detected heartbeat messages.

In an embodiment, adding the mobile radios that are not already on the in-range list to the in-range list includes setting the respective keepalive timers for the added mobile radios to an initial keepalive-timer value. In at least one such embodiment, maintaining the respective keepalive timers for the mobile radios on the in-range list includes resetting the respective keepalive timers of respective mobiles radios on the in-range list to the initial keepalive-timer value in response to detecting transmissions from the respective mobile radios. In at least one other such embodiment, the mobile radio adjusts the initial keepalive-timer value in accordance with the group-wide symmetric-timing protocol based on the count of mobile radios on the in-range list. In at least one other such embodiment, the mobile radio adjusts the initial keepalive-timer value in accordance with the group-wide symmetric-timing protocol based on a velocity of the given mobile radio.

In at least one embodiment, the alert indicates that the given mobile radio is on the verge of being out of a coverage range of the other mobile radios. In at least one such embodiment, the notification threshold is two or three. In at least one embodiment, the notification threshold is user-configurable. In at least one embodiment, the notification threshold is one and the alert indicates that the mobile radio is out of a coverage range of the other mobile radios. In at least one such embodiment, maintaining the in-range list of mobile radios further includes maintaining last-known locations of mobile radios on the in-range list; the mobile radio presents via the user interface a last-known location of one or more mobile radios that were on the in-range list during a substantially immediately preceding time period.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts a coverage area of a mobile radio, in accordance with at least one embodiment. As shown, a group of mobile radios 100 includes mobile radios 102, 104, 106, and 108. Mobile radios 104-108 are within a coverage area 112 of a mobile radio 102, and are communicatively connected to mobile radio 102 via respective communication links 114, 116, and 118. The combination of mobile radios 102-108 and communication links 114-118 may form a direct-mode wireless network in the form of (for example) a mobile ad-hoc network (MANET), a wireless mesh network, and/or a wireless sensor network, among other examples.

In an embodiment, coverage area (or "range") 112 represents the geographic area in which any of mobile radios 104-108 may be located if mobile radio 102 is to communicate with those mobile radios. The size of coverage area 112 can be affected by one or more factors such as the transmission power of a wireless-communication interface of mobile radio 102 and/or the topography surrounding mobile radio 102, among numerous other factors. In an embodiment, the mobile radio 102 has equal transmission (i.e., outbound) and reception (i.e., inbound) coverage ranges. In an embodiment, each of mobile radios 104-108 has a respective coverage area as well. Indeed, it may be the case that each mobile radio in a group of mobile radios—e.g., each mobile radio in the group of mobile radios 102-108—is equipped, programmed, and configured to carry out the presently disclosed methods and systems; still further, each mobile radio in such a group of mobile radios may be configured such that they each have the same communication range (i.e., the same outbound range and the same inbound range), and may in fact be configured such that each mobile radio's outbound range and inbound range are equal. And those of skill in the art will understand that "equal" as used in this paragraph means "configured to be equal," and that in various different situations, the actual ranges may vary slightly from one another, and thus may be considered "substantially equal" or the like.

Communication links 114-118 may take the form of respective radio-frequency (RF) air-interface links between respective mobile radios that are each within the other's respective coverage areas. The air-interface links may comply with one or more of the standards discussed above (e.g., P25, TETRA, WiFi, etc.), among numerous other possibilities. A given mobile radio could function to relay communication between other mobile radios that are within the respective coverage area of the given mobile radio.

Figure 2:
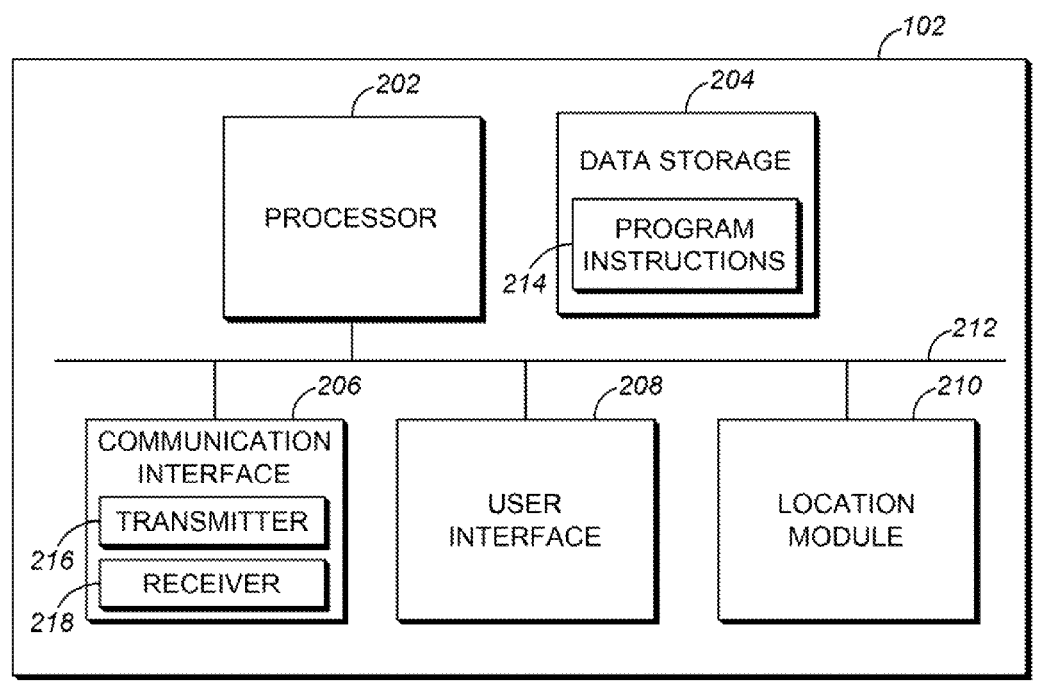
FIG. 2 depicts various components of a mobile radio, in accordance with at least one embodiment.

FIG. 2 depicts various components of a mobile radio, in accordance with at least one embodiment. In particular, FIG. 2 depicts mobile radio 102 as including a processor 202, a data storage 204, a communication interface 206, a user interface 208, and a location module 210, all of which are communicatively coupled with one another via a system bus 212 (or other suitable communication connection, network, or the like).

Processor 202 may include one or more processors of any type deemed suitable by those of skill in the relevant art, some examples including a general-purpose microprocessor, a dedicated digital signal processor (DSP), and a graphics processor.

Data storage 204 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 2, data storage 204 contains program instructions 214 executable by processor 202 for carrying out various functions described herein. Data storage 204 may further contain operational data (such as an in-range list of mobile radios, etc.) for carrying out one or more of the functions described herein. In an embodiment in which a computing system (such as mobile radio 102) is arranged, programmed, and configured to carry out processes described herein (such as process 500 described below), the program instructions 214 are executable by processor 202 for carrying out those functions. In instances where one or more other entities described herein have a structure similar to that of mobile radio 102, the respective program instructions 214 for those respective devices are executable by their respective processors 202 to carry out functions respectively performed by those devices.

Communication interface 206 may include one or more wireless-communication interfaces (for communicating according to, e.g., RF, LTE, LMR, WiFi, Bluetooth, and/or one or more other wireless-communication protocols) and/or wired-communication interfaces (for communicating according to, e.g., Ethernet, USB, and/or one or more other wired-communication protocols). As such, communication interface 206 may include any necessary hardware (e.g., chipsets, antennas, Ethernet cards, etc.), any necessary firmware, and/or any necessary software for conducting one or more forms of communication with one or more other entities as described herein. As depicted in FIG. 2, communication interface 206 includes a transmitter 216 and a receiver 218. Transmitter 216 can be configured to transmit on one of a set of channels. Receiver 218 can be configured to receive on one of a set of channels, which typically would not be the channel in use by the transmitter at the time.

Figure 3:
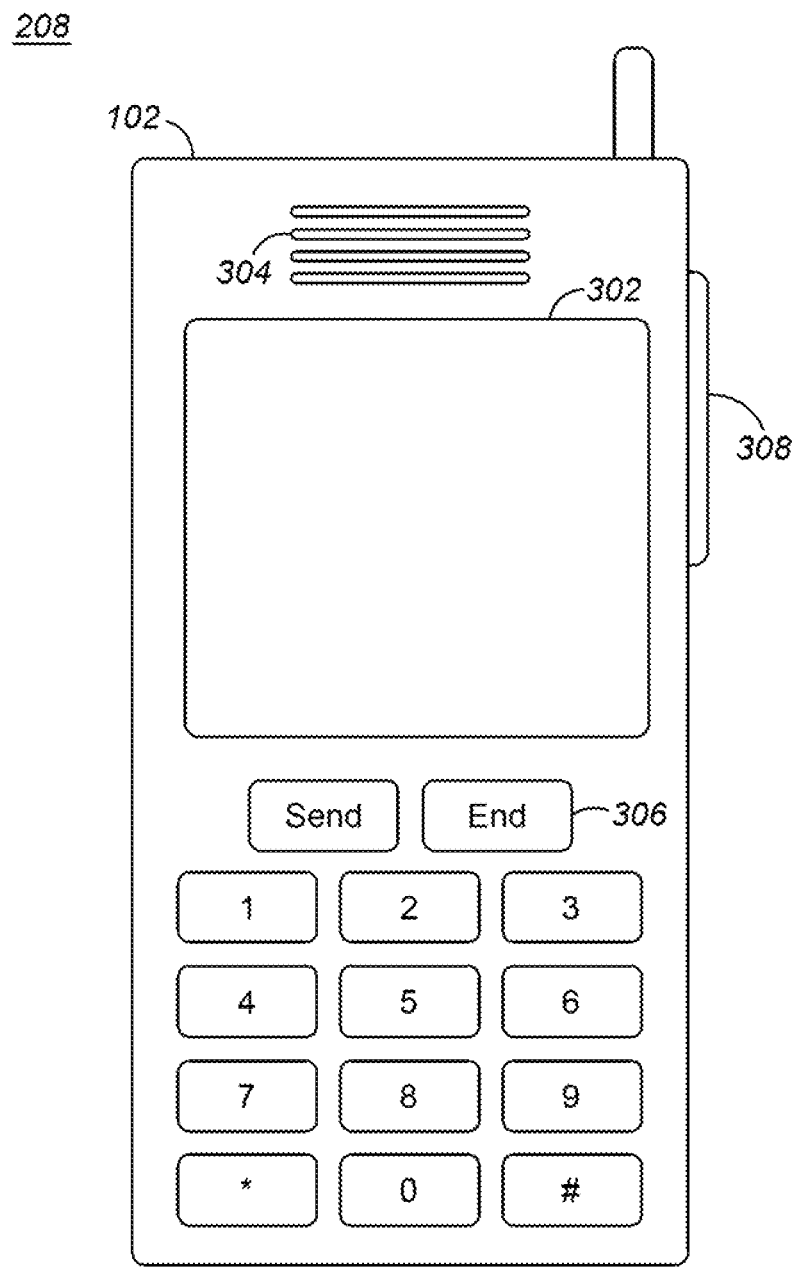
FIG. 3 depicts a user interface of a mobile radio, in accordance with at least one embodiment.

An embodiment of user interface 208 is depicted in FIG. 3. As shown, the user interface 208 includes a display 302, a loudspeaker 304, one or more dial keys 306, and a push-to-talk button 308. User interface 208 may include additional and/or different user-interface components such as one or more touchscreens, switches, microphones, light emitting diodes (LEDs), and the like. One or more user-interface components (e.g., an interactive touchscreen-and-display component) could provide both user-input and user-output functionality. And other user-interface components could be implemented in a given context, as known to those of skill in the art.

Returning to FIG. 2, location module 210 could be any combination of hardware and/or software that is capable of performing the location-determination functions described herein. In an embodiment, mobile radio 102 includes a Global Positioning System (GPS) receiver, and location module 210 is configured to derive a location based on messages transmitted by a GPS satellite and obtained via the GPS receiver. In another embodiment, location module 210 is configured to triangulate a position based on radio signals received from one or more base stations and/or mobile radios via communication interface 206. Those of skill in the art will appreciate that other means of determining a location are possible as well.

FIG. 4 depicts an in-range list of mobile radios, in accordance with at least one embodiment. As shown, the in-range list 400 includes list entries 402, 404, and 406 associated with mobile radios 104, 106, and 108, respectively. In the embodiment illustrated in FIG. 4, a respective entry stores one or more of a mobile-radio ID 412, a keepalive-timer value 414, and/or a last-known location 416. Mobile-radio ID 412 could be an identifier included in (and/or derived from) a transmission from the associated mobile radio, and could take the form of (or include) an International Mobile Subscriber Identity (IMSI) and/or an Individual Short Subscriber Identity (ISSI) (among other possibilities). Keepalive timer 414 could count down from a given initial value and/or could count up from zero (or another value), as examples. Last-known location 416 could take the form of (or include) GPS coordinates, a street address, and/or a cell identifier, as examples. Those of skill in the art will appreciate that a respective list entry may include data different from and/or in addition to the just-described mobile-radio ID, keepalive timer, and last-known location.

Figure 5:
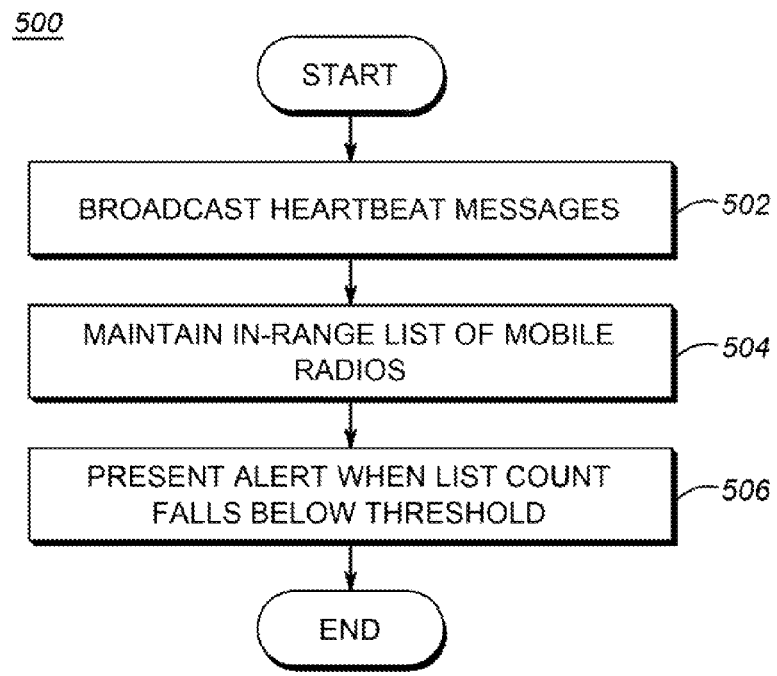
FIG. 5 is a flowchart of a process, in accordance with at least one embodiment.

FIG. 5 is a flowchart of a process, in accordance with at least one embodiment. As shown, process 500 begins at step 502 with mobile radio 102 broadcasting heartbeat messages in accordance with a group-wide symmetric-timing protocol. At step 504, mobile radio 102 maintains in-range list 400 of mobile radios, and at step 506, mobile radio 102 presents an alert via user interface 208 when a count of mobile radios on in-range list 400 falls below a notification threshold.

The broadcast heartbeat messages may include (for example) an identifier of mobile radio 102 (such as an ISSI), a location of the mobile radio (such as GPS coordinates), and/or the identities of any mobile radios on in-range list 400, among other possibilities. The broadcast heartbeat message could be addressed to one or more respective mobile radios (e.g., one or more of mobile radios 104, 106, and 108) and/or addressed to a group of mobile radios (based on a subnet mask or group identifier, as examples). It should be noted, however, that the broadcast heartbeat message need not be addressed to any particular or group of radios.

Mobile radio 102 may broadcast a respective heartbeat message if the mobile radio has not transmitted any radio communication within a preceding time interval. In an embodiment, mobile radio 102 broadcasts a heartbeat message at an expiration of a heartbeat timer. In various different embodiments, such heartbeat messages may include the broadcasting mobile radio's unit ID, location, and/or one or more other pieces of information deemed suitable by those of skill in the art for a given implementation or in a given context. The mobile radio may set the heartbeat timer to an initial heartbeat-timer value and may broadcast the heartbeat message at the expiration of the timer. The initial value could represent, for example, a number of seconds, minutes, and/or hours, among other possibilities. The mobile radio may reset the heartbeat timer to the initial value in response to transmitting voice data, a signaling message, and/or a heartbeat message (among other examples).

Mobile radio 102 may adjust an initial value (a.k.a. the reset value) of a heartbeat timer based on one or more factors such as the count of mobile radios on in-range list 400 and/or the velocity of mobile radio 102 (and/or the velocity of any of the mobile radios on the in-range list). With respect to the count of mobile radios on in-range list 400, the mobile radio may increase the initial value of the heartbeat timer for high counts of mobile radios on in-range list 400, and/or may decrease the initial value of the heartbeat timer in response to detecting lower counts of mobile radios on in-range list 400. With respect to the velocity of the mobile radio, the mobile radio may decrease the initial value of the heartbeat timer when moving (and/or when detecting movement of one or more other mobile radios) at higher velocities, and/or may increase the initial value of the heartbeat timer when moving (and/or when detecting movement of one or more other mobile radios) at lower velocities. Mobile radio 102 may broadcast the heartbeat messages in accordance with the group-wide symmetric-timing protocol such that all of the mobile radios in the group (i) set the initial values of their respective heartbeat timers to the same initial value and/or (ii) make the same adjustments to the initial heartbeat-timer values based on any given one or more factors, among other possibilities.

Figure 6:
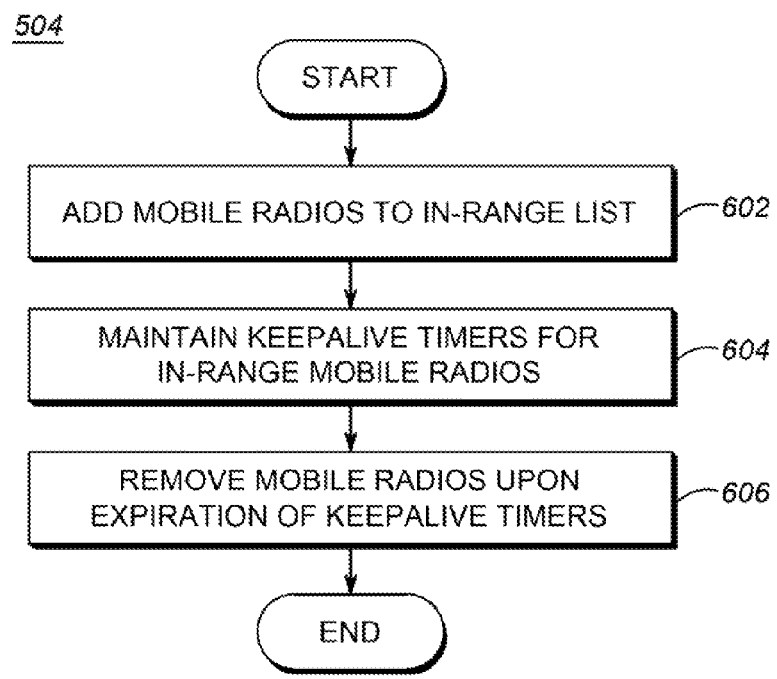
FIG. 6 is a flowchart of another process, in accordance with at least one embodiment.

FIG. 6 is a flowchart of a process for maintaining in-range list 400 of mobile radios (as carried out at step 504 of process 500), in accordance with at least one embodiment. As shown, at step 602, mobile radio 102 adds mobile radios that are not already on in-range list 400 to the in-range list upon detecting transmissions from such mobile radios. At step 604, mobile radio 102 maintains, for each mobile radio on in-range list 400, a respective keepalive timer in accordance with the group-wide symmetric-timing protocol. And at step 606, mobile radio 102 removes mobile radios from in-range list 400 upon expiration of the respective keepalive timers.

Detecting transmissions from mobile radios may involve detecting transmitted heartbeat messages, transmitted voice data, and/or transmitted signaling messages, among other possibilities. The detected transmission could include metadata. In at least one embodiment, the detected heartbeat messages include respective locations of the transmitting mobile radios, and maintaining the in-range list of mobile radios includes maintaining last-known locations of mobile radios on in-range list 400 based on the locations in the detected heartbeat messages.

In an embodiment, mobile radio 102 sets the respective keepalive timers for the added mobile radios to an initial keepalive-timer value. In the embodiment depicted in FIG. 4, mobile radio 102 sets the respective keepalive timers for added mobile radios 104, 106, and 108 to 60 seconds (though other initial values are certainly possible as well, such as but not limited to values between 60 seconds and 600 seconds).

Maintaining the respective keepalive timers for the mobile radios on in-range list 400 may include resetting the respective keepalive timers of the mobile radios on the in-range list to the initial keepalive-timer value. Mobile radio 102 may reset the timer value to the initial keepalive-timer value in response to, for example, detecting respective transmissions (such as heartbeat messages, voice data, signaling messages, etc.) from the mobile radios. Mobile radio 102 may remove mobile radios from in-range list 400 upon expiration of their respective keepalive timers (e.g., upon their respective keepalive timers reaching 0).

Mobile radio 102 may adjust the initial value (a.k.a. the reset value) of the keepalive timer based on one or more factors such as the count of mobile radios on in-range list 400 and/or the velocity of mobile radio 102 (and/or the velocity of any of the mobile radios on the in-range list). With respect to the count of mobile radios on in-range list 400, the mobile radio may increase the initial value of the keepalive timer for high counts of mobile radios on in-range list 400, and/or may decrease the initial value of the keepalive timer in response to detecting lower counts of mobile radios on in-range list 400. With respect to the velocity of the mobile radio, the mobile radio may decrease the initial value of the keepalive timer when moving (and/or when detecting movement of one or more other mobile radios) at higher velocities, and/or may increase the initial value of the keepalive timer when moving (and/or when detecting movement of one or more other mobile radios) at lower velocities. Mobile radio 102 may adjust the initial keepalive-timer value in accordance with a group-wide symmetric-timing protocol such that all of the mobile radios in the group (i) set the initial values of their respective keepalive timers to the same initial value and/or (ii) make the same adjustments to the initial keepalive-timer values based on any given one or more factors, among other possibilities.

The alert (presented at step 506 when the count of mobile radios on in-range list 400 falls below the notification threshold) may indicate that the given mobile radio is on the verge of being out of a coverage range of other mobile radios and/or may indicate that the given mobile radio is out of a coverage range of other mobile radios, among other possibilities. In an embodiment, the notification threshold is two (or perhaps three), and the presented alert indicates that the given mobile radio is on the verge of being out of a coverage range of the other mobile radios. In an embodiment, the notification threshold is one, and the alert indicates that the given mobile radio is out of a coverage range of other mobile radios. In some embodiments, the notification threshold is user-configurable. Those of skill in the art will appreciate that other notification thresholds are possible as well.

The alert may be presented via display 302 and/or loudspeaker 304 of user interface 208, among other examples. The alert may specify the number of mobile radios that remain on in-range list 400, the time at which the mobile-radio count fell below the threshold, and/or the locations of one or more mobile radios that remain on the in-range list, among numerous other possibilities.

In addition to presenting the alert, the mobile radio may present a last-known location of one or more mobile radios that were on in-range list 400 during a substantially immediately preceding time period. For example, the mobile radio may maintain a recently-in-range list of mobile radios, which could take a form similar to in-range list 400 of mobile radios. Upon removing a given mobile radio from in-range list 400, mobile radio 102 may add the given mobile radio to the recently-in-range list. The list entry associated with the given mobile may include a time at which mobile radio 102 was last in the coverage area of the given mobile radio and/or the last-known location of the given mobile radio (among numerous other possibilities). Mobile radio 102 may present (in addition to the out-of-coverage alert) the last-known location of, e.g., the mobile radio that was most-recently added to the recently-in-range list and/or the mobile radio that has the most-recent last-known location, among other possibilities, including presenting via the user interface 208 one or more indications of directions in which to travel towards such a last-known location.

Figure 7:
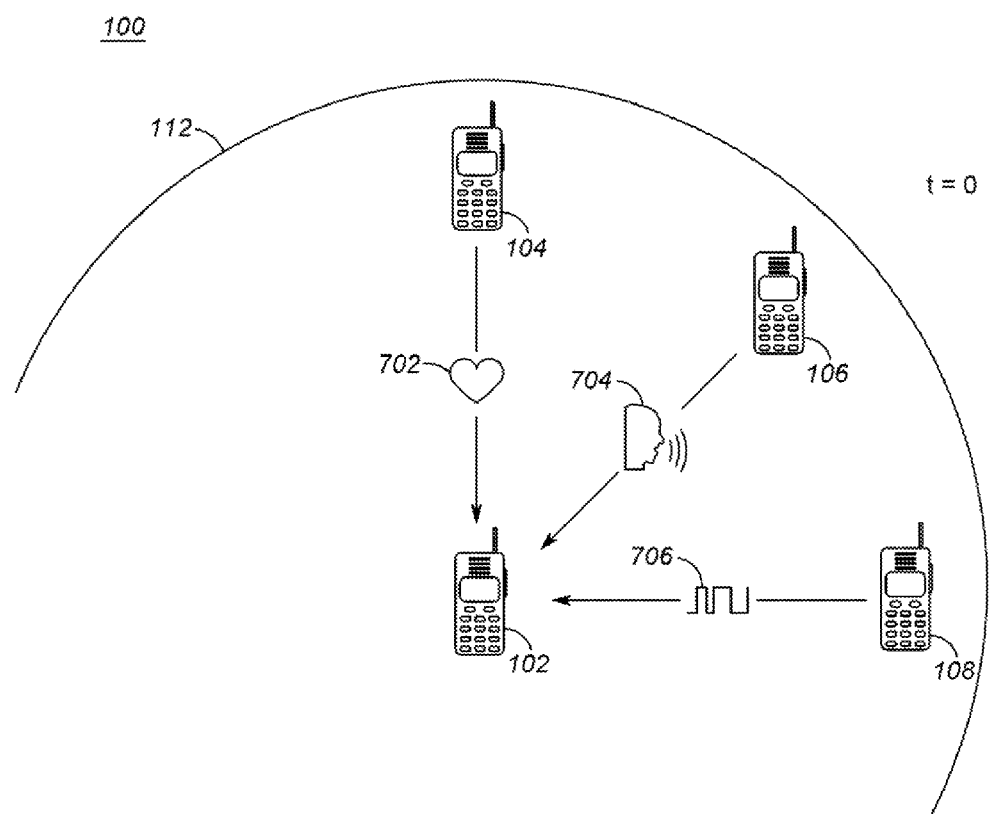
FIGS. 7, 9, 12, and 15 depict a coverage area of a mobile radio at a first, second, third, and fourth time, respectively, in accordance with at least one embodiment.

FIGS. 7 through 16 depict an example operation of process 500, in accordance with at least one embodiment. Specifically, FIG. 7 depicts coverage area 112 of mobile radio 102 at or about a first time t=0. As shown, mobile radios 104, 106, and 108 are within the coverage area 112 of mobile radio 102, which receives and detects heartbeat message 702, voice data 704, and a signaling message 706.

FIG. 8 depicts in-range list 400 at or about t=0 after mobile radio 102 adds mobile radios 104, 106, and 108 to the in-range list 400. Initially, in-range list 400 is empty. In response to detecting transmissions from mobile radios 104, 106, and 108 at or about a time t=0, mobile radio 102 adds mobile radios 104, 106, and 108 to the in-range list 400 as list entries 402, 404, and 406. In an embodiment, detected heartbeat message 702 includes a location of mobile radio 104, and the mobile radio stores the location in list entry 402 as a last-known location 416 of mobile radio 104. In an embodiment, an initial keepalive-timer value is set to 60 seconds. Mobile radio 102 sets the respective keepalive timers for the added mobile radios to 60 seconds, and the keepalive timers begin to count down to zero.

Figure 9:
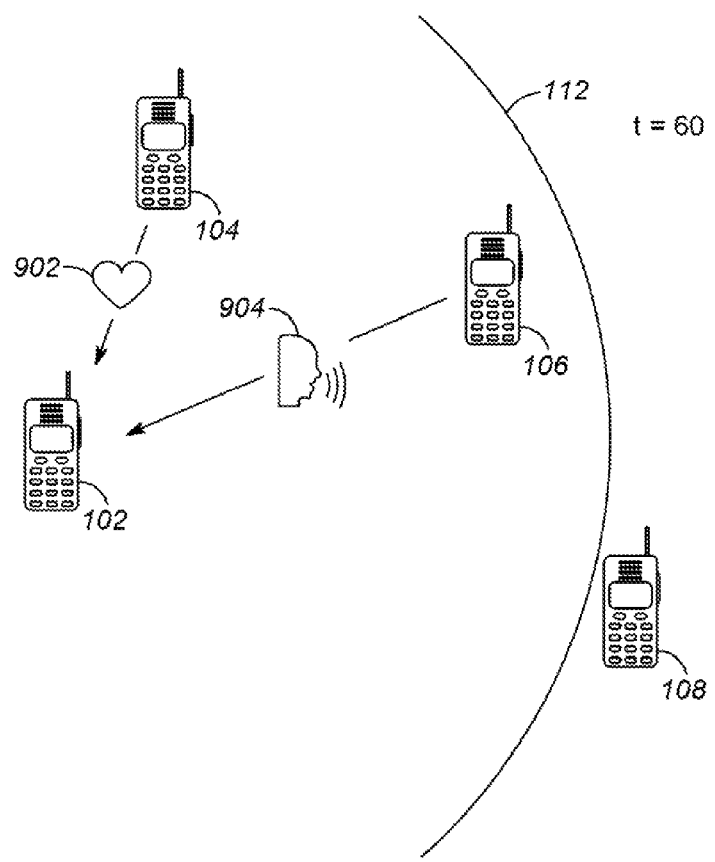

FIG. 9 depicts coverage area 112 of mobile radio 102 at or about a second time t=60. As shown, mobile radio 108 is no longer within the coverage area 112 of mobile radio 102, though mobile radios 104 and 106 remain within the coverage area 112. Mobile radio 102 detects both a heartbeat message 902 transmitted by mobile radio 104 and voice data 904 transmitted by mobile radio 106.

FIG. 10 depicts in-range list 400 at or about t=60. In response to detecting respective transmissions 902 and 904, mobile radio resets the respective keepalive timers of mobile radios 104 and 106 to the initial keepalive-timer value of 60 seconds. In an embodiment, detected heartbeat message 902 includes a location of mobile radio 104, and the mobile radio again stores the location in list entry 402 as a last-known location 416 of mobile radio 104 (replacing the previously stored last-known location of mobile radio 104). Mobile radio 102 does not detect any transmissions from mobile radio 108 in the 60 seconds preceding t=60 (perhaps because mobile radio 102 left the coverage area of mobile radio 108 at or soon after t=0) and the respective keepalive timer of mobile radio 108 expires at or about t=60. Upon expiration of that keepalive timer, mobile radio 102 removes mobile radio 108 from the in-range list 400 and the count of mobile radios on the list drops to two.

Figure 11:
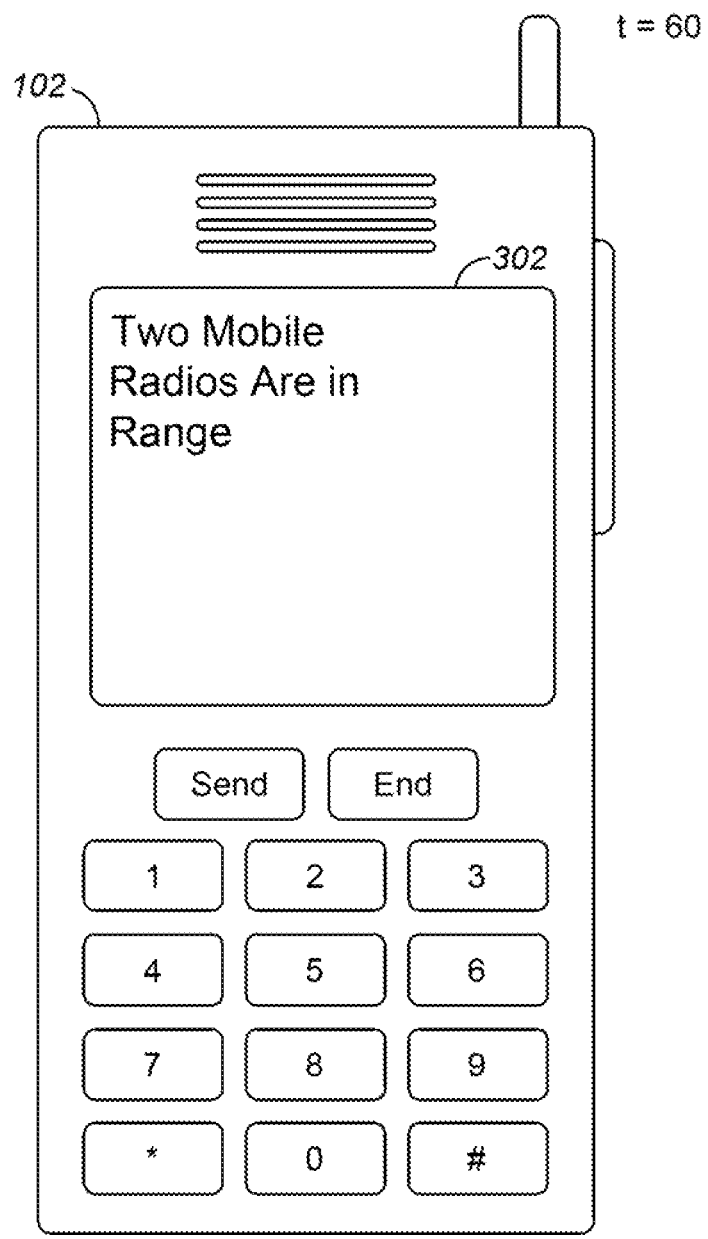
FIGS. 11, 14, and 16 depict a user interface of a mobile radio at a second, third, and fourth time, respectively, in accordance with at least one embodiment.

FIG. 11 depicts user interface 208 at or about time t=60. In an embodiment, the notification threshold is three, and mobile radio 102 presents an alert via display 302 indicating that two mobile radios remain on in-range list 400. In another embodiment, the notification may indicate that the mobile radio 102 is on the verge of coverage with the other mobile radios.

Figure 12:
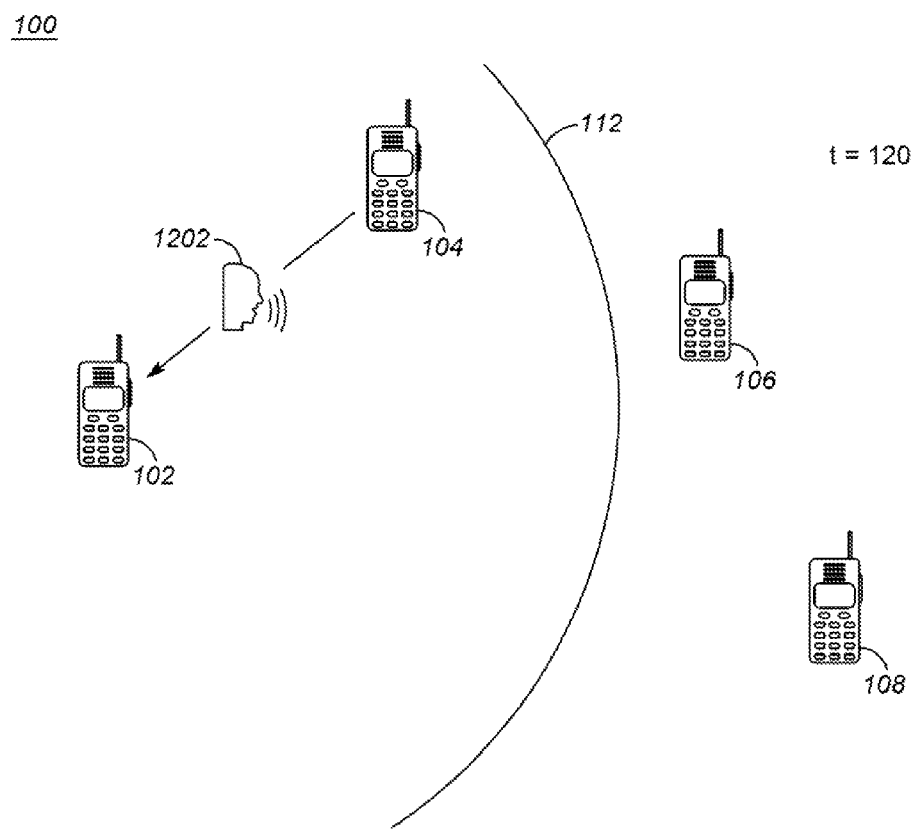

FIGS. 12 and 13 depict coverage area 112 and in-range list 400, respectively, of mobile radio 102 at or about a third time t=120, in accordance with various embodiments. As shown, only mobile radio 104 remains within the coverage area 112 of mobile radio 102. Mobile radio 102 detects voice data 1202 transmitted by mobile radio 104 and responsively resets the respective keepalive timer of mobile radio 104 to the initial keepalive-timer value of 60 seconds. Mobile radio 102 does not detect any transmissions from mobile radio 106 in the 60 seconds preceding t=120 and the respective keepalive timer of mobile radio 106 is expires at or about t=120. Upon expiration of that keepalive timer, mobile radio 102 removes mobile radio 106 from in-range list 400 and the count of mobile radios on the in-range list drops to one.

Figure 14:
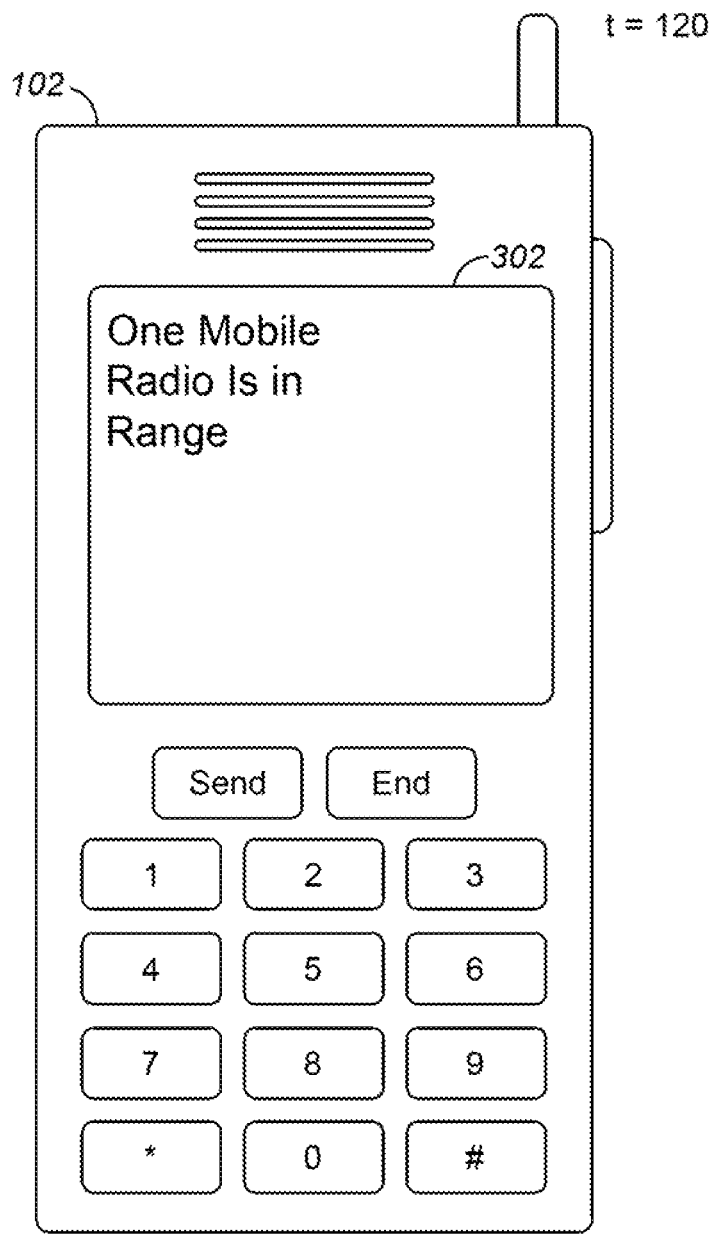

FIG. 14 depicts user interface 208 at or about time t=120. In an embodiment, a second notification threshold is two, and mobile radio 102 presents an alert via display 302 indicating that only one mobile radio remains on in-range list 400. In another embodiment, the notification may indicate that the mobile radio 102 is on the verge of coverage with the other mobile radios.

Figure 15:
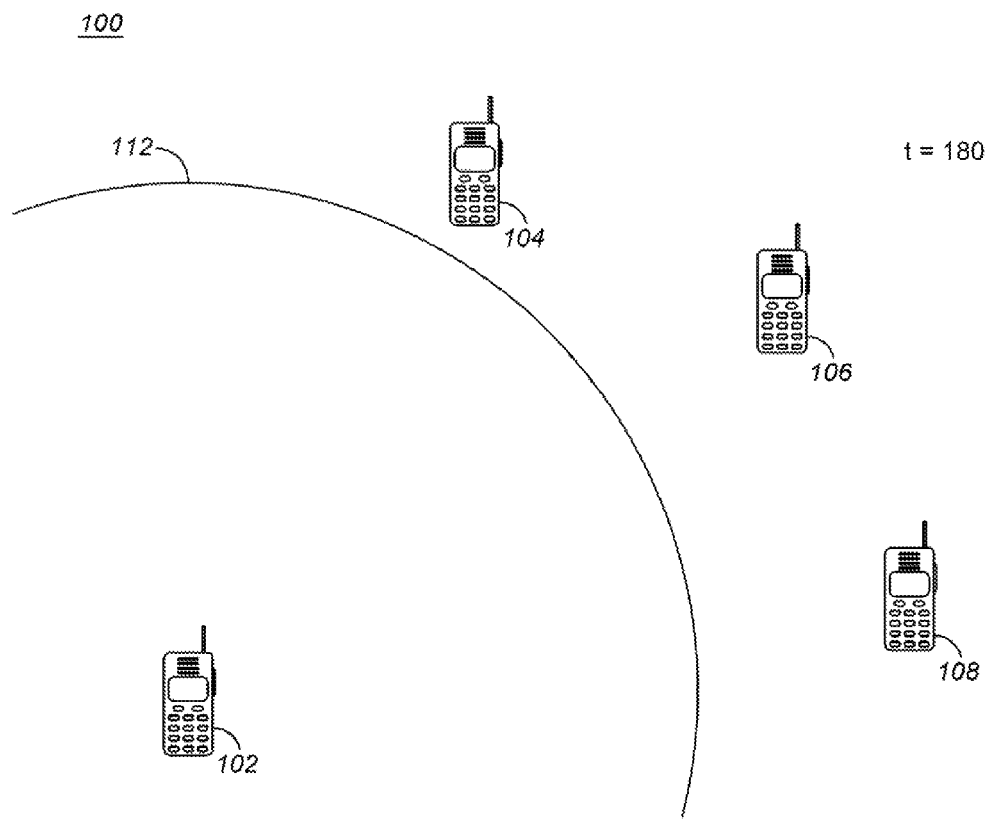
Figure 16:
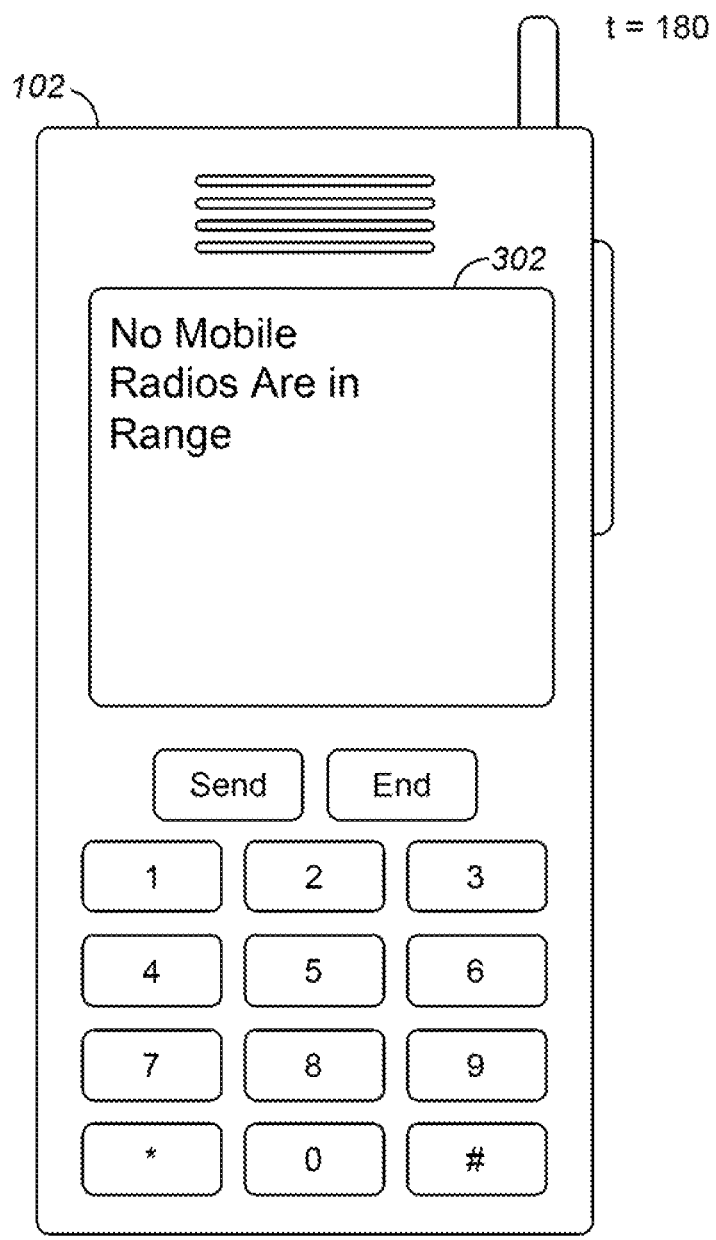

FIGS. 15 and 16 depict coverage area 112 and user interface 208, respectively, of mobile radio 102 at or about a fourth time t=180. As shown in FIG. 15, none of mobile radios 104, 106, and 108 remain within coverage area 112. Mobile radio 102 does not detect any transmissions from mobile radio 104 in the 60 seconds preceding t=180 and the respective keepalive timer of mobile radio 104 expires at or about t=180. Upon expiration of that keepalive timer, mobile radio 102 removes mobile radio 104 from in-range list 400 and the count of mobile radios on the in-range list 400 drops to zero. In an embodiment, a third notification threshold is zero, and mobile radio 102 presents an alert via display 302 that the mobile radio is out of a coverage range of the other mobile radios.

Figure 17:
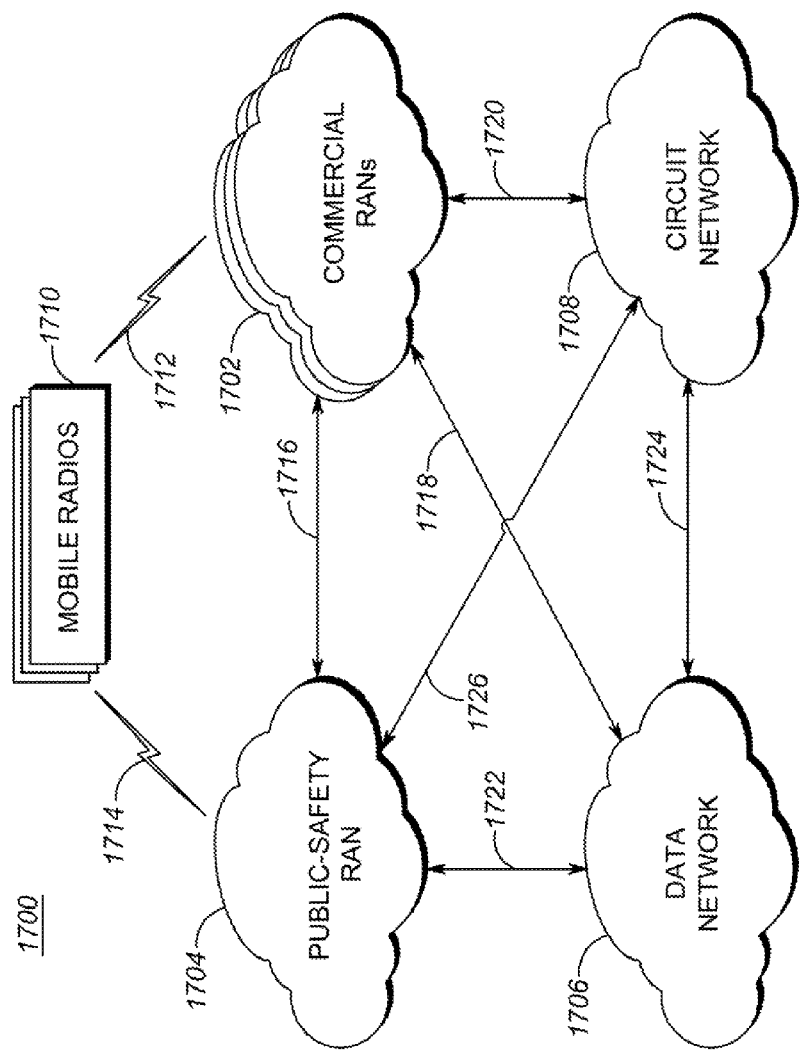
FIG. 17 depicts a communication system, in accordance with at least one embodiment.
Figure 18:
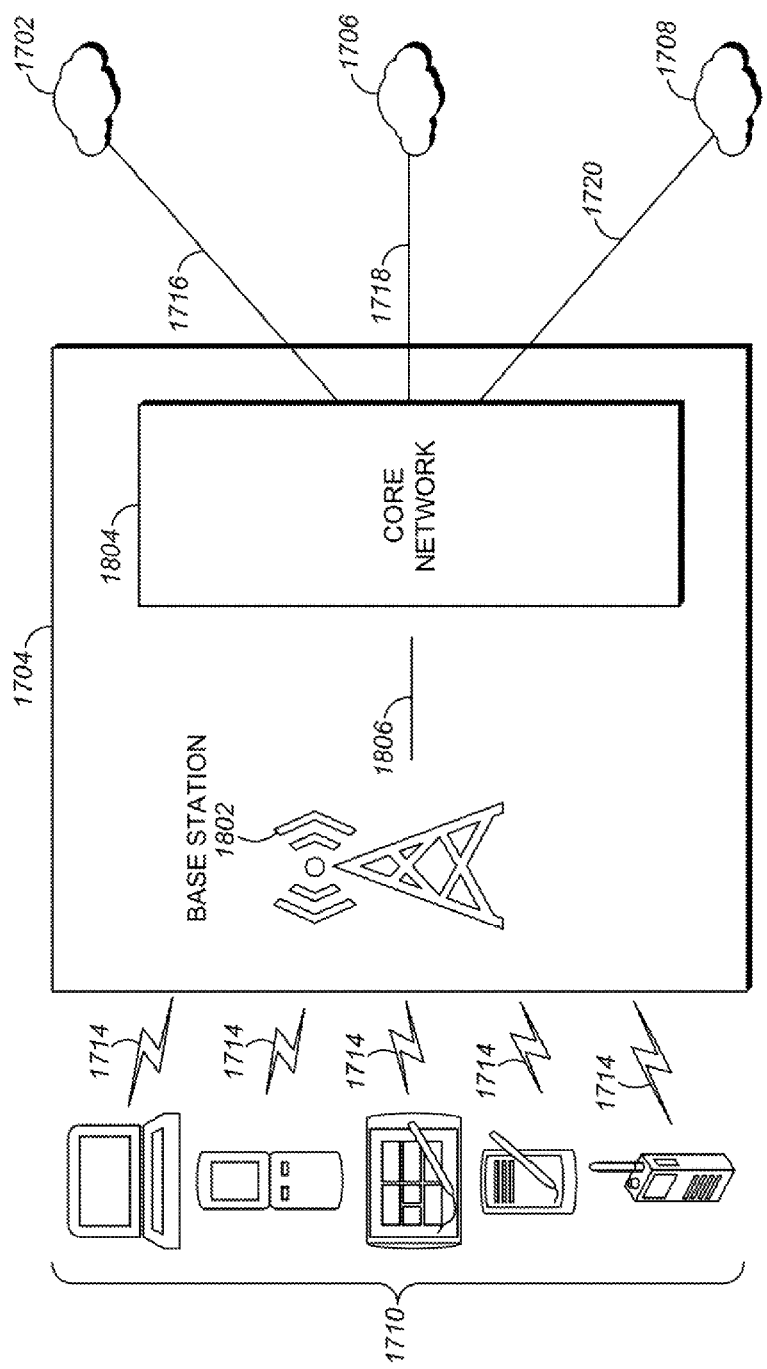
FIG. 18 depicts a radio access network, in accordance with at least one embodiment.

The next portion of this disclosure includes descriptions of FIGS. 17-18, which in general depict a communication system in which mobile radios communicate via one or more RANs. It is explicitly noted that mobile radios that communicate via one or more RANs may also be capable of communicating directly with one another in the manner described above. Thus, while mobile radios that are capable of engaging in communication directly with one another but not via one or more RANs could certainly carry out and embody the present methods and systems, mobile radios that are capable of both direct-mode and RAN-based communication could certainly carry out and embody the present methods and systems as well.

FIG. 17 depicts an example communication system, in accordance with at least one embodiment. In particular, FIG. 17 depicts an example communication system 1700 that includes one or more commercial radio access networks (RANs) 1702, a public-safety RAN 1704, a data network 1706, and a circuit network 1708, which are interconnected via communication links 1716-1724. One or more mobile radios 1710 are connected to at least one of commercial RANs 1702 and public-safety RAN 1704 via air-interface links 1712 and 1714, respectively.

An example public-safety RAN 1704 is discussed below in connection with FIG. 18, though in general, each RAN 1702 and RAN 1704 include typical RAN elements such as base stations, base station controllers, routers, switches, and the like, arranged, connected, and programmed to provide wireless service to user equipment (e.g., mobile radios 1710) in a manner known to those of skill in the relevant art.

Public-safety RAN 1704 may include one or more packet-switched networks and/or one or more circuit-switched networks, and in general functions to provide one or more public-safety agencies with any necessary computing and communication needs. Thus, public-safety RAN 1704 may include a dispatch center communicatively connected with data network 1706 and also with circuit network 1708, for retrieving and transmitting any necessary public-safety-related data and communications. Public-safety RAN 1704 may also include any necessary computing, data-storage, and data-presentation resources utilized by public-safety personnel in carrying out their public-safety functions. Moreover, public-safety RAN 1704 may include one or more network access servers (NASs), gateways, and the like for bridging communications to one or more other entities and/or networks, such as commercial RANs 1702, data network 1706, and circuit network 1708, as representative examples.

Data network 1706 may be, include, or be a part of the global network of networks typically referred to as the Internet. Data network 1706 may be a packet-switched network, and entities (i.e., servers, routers, computers, and the like) that communicate over data network 1706 may be identified by a network address such as an Internet Protocol (IP) address. Moreover, data network 1706 may include one or more NASs, gateways, and the like for bridging communications to one or more other entities and/or networks, such as commercial RANs 1702, public-safety RAN 1704, and circuit network 1708, as representative examples.

Circuit network 1708 may be, include, or be a part of the circuit-switched telephone network commonly referred to as the public switched telephone network (PSTN), and in general functions to provide circuit-switched communications to various communication entities as is known in the relevant art. Moreover, circuit network 1708 may include one or more NASs, gateways, and the like for bridging communications to one or more other entities and/or networks, such as commercial RANs 1702, public-safety RAN 1704, and data network 1706, as representative examples.

Air-interface links 1712 and 1714 may each include a respective downlink and a respective uplink. Any one or more of the downlinks and/or uplinks may take the form of respective air-interface channels and could be modulated using TDMA, FDMA, and/or Quadrature Phase-Shift Keying (QPSK), among numerous other examples known to those of skill in the relevant art. A respective downlink channel could (though need not) take the form of a shared channel, and could provide one or more of a circuit-mode-data service, a packet-mode-data service, and/or a Short Data Service (SDS) (i.e., a Short Message Service (SMS)), among numerous other examples known to those of skill in the relevant art. Communication over a given channel may be addressed to a single mobile radio using an identifier uniquely associated with that single mobile radio and/or to multiple mobile radios (e.g., in a manner similar to that described above with respect to direct-mode communication).

Any one or more of communication links 1716-1724 could include one or more communication devices, networks, connections, switches, bridges, routers, and the like. Any or all of communication links 1716-1724 could make use of wired and/or wireless forms of communication. Moreover, one or more communication links instead of and/or in addition to communication links 1716-1724 could be present.

Mobile radios 1710 may be any suitable computing and communication devices configured to engage in wireless communication with one or both of commercial RANs 1702 over air interface 1712 as is known to those in the relevant art and public-safety RAN 1704 over air interface 1714 as is known to those in the relevant art. Some example mobile radios and wireless-communication links are discussed throughout this detailed description with reference to various figures.

FIG. 18 depicts a RAN, in accordance with at least one embodiment. In particular, FIG. 18 depicts public-safety RAN 1704 as including a base station 1802, which communicates directly or indirectly with a core network 1804 over a communication link 1806. As is the case with each of the links mentioned above, and as is the case with any of the communication links mentioned anywhere else in this disclosure, communication link 1806 may take the form of (or include) one or more wireless-communication links and/or one or more wired-communication links, as deemed suitable by those of skill in the relevant art in a given context.

In at least one embodiment, base station 1802 includes the hardware and software (and/or firmware) necessary for the base station to function as a NodeB, an eNodeB, a BTS, a WiFi access point, and/or any other type of base station, as known to those having skill in the relevant art. In some instances, base station 1802 in RAN 1704 may also include functionality typically associated in the art with entities that are often referred to by terms such as base station controllers (BSCs), radio network controllers (RNCs), and the like. Also, while one base station 1802 is depicted by way of example in FIG. 18, any suitable number of base stations could be deployed as deemed suitable by those of skill in the relevant art.

In general, base station 1802 is any entity that, on one side (i.e., the wireless-network side (interface)), engages in wireless communication over air interface 1714 with one or more of mobile radios 1710 according to a protocol such P25 or the like and, on the other side (i.e., the "backhaul" side), engages in communications with core network 1804 via communication link 1806, to facilitate communications between various mobile radios such as mobile radios 1710 and networks such as networks 1702, 1706, and 1708.

Core network 1804 may include one or more network entities such as one or more mobility management entities (MMEs), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to mobile radios 1710 via base station 1802, and to bridge such wireless service with various transport networks. In general, a commercial RAN and a public-safely RAN may each provide wireless service according to a protocol such as P25, LTE, WiFi, and/or the like. These examples are provided for illustration and not by way of limitation; moreover, those of skill in the relevant art are aware of variations among different protocols and among different implementations of a given protocol, and of similarities across different protocols.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method carried out by a given mobile radio in a group of mobile radios, the method comprising:
broadcasting heartbeat messages in accordance with a group-wide symmetric-timing protocol;
maintaining an in-range list of mobile radios at least in part by:
adding mobile radios that are not already on the in-range list to the in-range list upon detecting transmissions from such mobile radios;
maintaining, for each mobile radio on the in-range list, a respective keepalive timer in accordance with the group-wide symmetric-timing protocol; and
removing mobile radios from the in-range list upon expiration of the respective keepalive timers; and
presenting an alert via a user interface when a count of mobile radios on the in-range list falls below a notification threshold.

2. The method of claim 1, wherein broadcasting heartbeat messages in accordance with the group-wide symmetric-timing protocol comprises broadcasting a heartbeat message at an expiration of a heartbeat timer.

3. The method of claim 2, further comprising resetting the heartbeat timer to an initial heartbeat-timer value in response to transmitting at least one of voice data, a signaling message, and a heartbeat message.

4. The method of claim 2, further comprising adjusting the initial heartbeat-timer value in accordance with the group-wide symmetric-timing protocol based on the count of mobile radios on the in-range list.

5. The method of claim 2, further comprising adjusting the initial heartbeat-timer value in accordance with the group-wide symmetric-timing protocol based on a velocity of the given mobile radio.

6. The method of claim 1, further comprising including a location of the given mobile radio in at least one broadcasted heartbeat message.

7. The method of claim 1, wherein detecting transmissions from mobile radios comprises detecting transmitted voice data from the mobile radios.

8. The method of claim 1, wherein detecting transmissions from mobile radios comprises detecting transmitted signaling messages from the mobile radios.

9. The method of claim 1, wherein detecting transmissions from mobile radios comprises detecting transmitted heartbeat messages from the mobile radios.

10. The method of claim 9, wherein the detected heartbeat messages comprise respective locations of the transmitting mobile radios, wherein maintaining the in-range list of mobile radios further comprises maintaining last-known locations of mobile radios on the in-range list based on the locations in the detected heartbeat messages.

11. The method of claim 1, wherein adding the mobile radios that are not already on the in-range list to the in-range list comprises setting the respective keepalive timers for the added mobile radios to an initial keepalive-timer value.

12. The method of claim 11, wherein maintaining the respective keepalive timers for the mobile radios on the in-range list comprises resetting the respective keepalive timers of respective mobiles radios on the in-range list to the initial keepalive-timer value in response to detecting transmissions from the respective mobile radios.

13. The method of claim 11, further comprising adjusting the initial keepalive-timer value in accordance with the group-wide symmetric-timing protocol based on the count of mobile radios on the in-range list.

14. The method of claim 11, further comprising adjusting the initial keepalive-timer value in accordance with the group-wide symmetric-timing protocol based on a velocity of the given mobile radio.

15. The method of claim 1, wherein the alert indicates that the given mobile radio is on the verge of being out of a coverage range of the other mobile radios.

16. The method of claim 15, wherein the notification threshold is two or three.

17. The method of claim 1, wherein the notification threshold is user-configurable.

18. The method of claim 1, wherein the notification threshold is one, wherein the alert indicates that the mobile radio is out of a coverage range of the other mobile radios.

19. The method of claim 18, wherein maintaining the in-range list of mobile radios further comprises maintaining last-known locations of mobile radios on the in-range list, the method further comprising:
    presenting via the user interface a last-known location of one or more mobile radios that were on the in-range list during a substantially immediately preceding time period.

20. A mobile radio comprising:
    a wireless-communication interface;
    a user interface;
    a processor; and
    data storage containing instructions executable by the processor for causing the mobile radio to carry out a set of functions, the set of functions comprising:
        broadcasting heartbeat messages in accordance with a group-wide symmetric-timing protocol;
        maintaining an in-range list of mobile radios at least in part by:
            adding mobile radios that are not already on the in-range list to the in-range list upon detecting transmissions from such mobile radios;
            maintaining, for each mobile radio on the in-range list, a respective keepalive timer in accordance with the group-wide symmetric-timing protocol; and
            removing mobile radios from the in-range list upon expiration of the respective keepalive timers; and
        presenting an alert via the user interface when a count of mobile radios on the in-range list falls below a notification threshold.

* * * * *